UNITED STATES PATENT OFFICE.

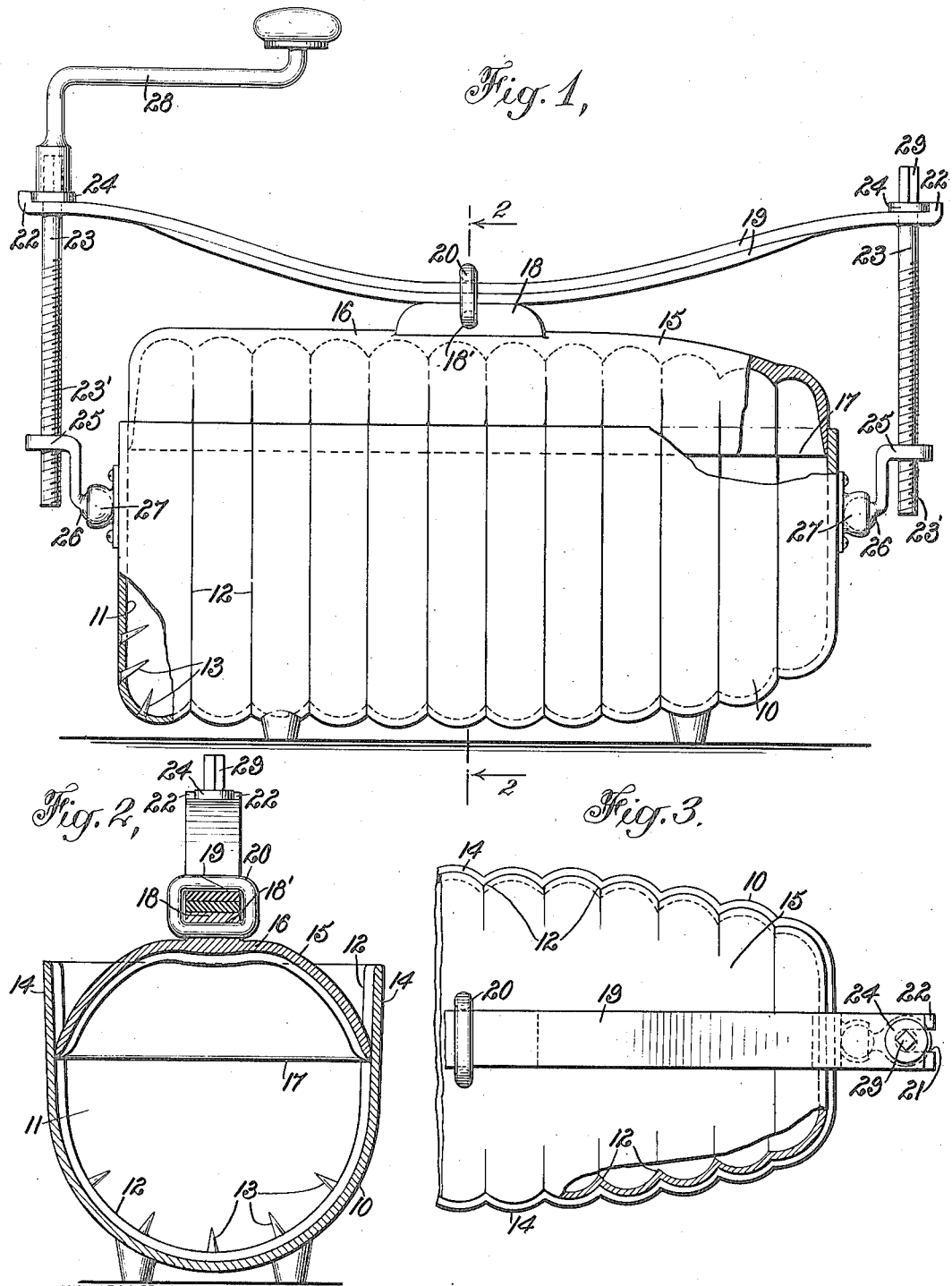

HANS ADELMANN, OF NEW YORK, N. Y., ASSIGNOR TO HAM BOILER CORPORATION, OF NEW YORK, N. Y., A CORPORATION OF NEW YORK.

MEAT-COOKER.

1,202,637. Specification of Letters Patent. Patented Oct. 24, 1916.

Application filed June 22, 1916. Serial No. 105,153.

*To all whom it may concern:*

Be it known that I, HANS ADELMANN, a citizen of the United States, and a resident of the city of New York, borough of the Bronx, in the county of Bronx and State of New York, have invented a new and Improved Meat-Cooker, of which the following is a full, clear, and exact description.

This invention relates to meat cookers and has particular reference to means for boiling boned hams or other meats. By the term "ham" as employed hereinafter, I wish, therefore, to be understood as covering broadly any analogous food product.

Among the objects of this invention is to improve the means for cooking hams so as to simplify the operation and at the same time deliver a ham with characteristic markings to indicate that the ham has been wrapped with a cord for the cooking operation.

Another object of the invention is to provide a receptacle or mold for the ham, the same being fitted with a plurality of strong points serving to retain the skin of the ham in proper place while being treated to prevent the shrinkage thereof that usually takes place whereby a ham of better appearance and sweeter flavor may be produced.

Another object of the invention is to improve the means for connecting the cover to the receptacle.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a side elevation of all the parts in assembled position as they would appear prior to compressing the ham; Fig. 2 is a vertical transverse section on the line 2—2 of Fig. 1 indicating the position after compression; and Fig. 3 is a plan view of one end of the complete device.

Referring now more particularly to the drawings, I show a receptacle to receive the ham, the same comprising a strong rigid metal body 10 having a rounded bottom approximating a semi-cylindrical form, but having one end tapered to receive the leg end of the ham. The other end, however, is made of the full diameter of the receptacle and is flat, as indicated at 11. The fleshy end of the ham by this form of the receptacle is turned out flat, so that when it is to be sliced the first cuts are of full size, and hence no waste results. As plainly shown in the drawings, the bottom and sides of the receptacle are provided with a series of parallel circumferential ridges 12 which impart to the boned ham the appearance of having been wrapped with a heavy cord in accordance with the usual practice in the cooking of hams. Furthermore, the ridges 12 very greatly strengthen or rigidify the receptacle whereby a thinner metal body may be utilized than would be required without such ridges.

Ordinarily a ham before it is cooked after being boned and skinned is wrapped in the skin, but unless extreme care is exercised in the wrapping of the ham, the skin during the cooking operation so shrinks as to expose the fleshy end of the ham whereby the appearance of the cooked product is depreciated and otherwise the meat is of less value. I provide, therefore, a series of prongs or points 13 at any convenient places within the bottom of the receptacle, shown preferably to coöperate with the fleshy end of the ham, whereby the skin is positively held from shrinking away from and exposing such end of the ham when it is boiled. The prongs 13 add no inconvenience to the operation of the cooker, since the ham will slip freely into place in the bottom of the receptacle and when pressed within the receptacle, the ham finds its position naturally around the points of these prongs and the skin is firmly held in place.

The side walls 14 of the receptacle are approximately vertical or are provided with a slight outward flare to facilitate the application of the cover 15. The cover fits slidably within the upper portion of the receptacle. It comprises a flat central portion 16. It is provided also with a downwardly projecting flange portion having a comparatively sharp edge 17 which glides close to the inner surface of the walls 14 and ends of the receptacle. The cover is of a strong form and the flat portion thereof 16 provides that the ham when completed will have a flat side on which to rest. At the center of the upper surface of the cover is formed a boss 18 having a transverse hole 18' formed therethrough. A double leaf spring 19 is secured to the upper surface of the boss 18 by means of any suitable clip or fastener 20 embracing the spring and projecting into or through the hole 18' of the boss. The spring is bowed upwardly at its ends and the extreme ends are bifurcated, as indicated at 21, and the points of the fork are bent upwardly at 22. A pair of jack screws 23 having quick pitched threads 23' at their lower ends are supported in the ends of the spring. Each screw has a head 24 resting in the seat formed just within the upwardly projecting points 22 and the screw is freely rotatable in the seat or slot formed between the points. The threaded end of each screw coöperates with a nut 25 having a ball 26 connected rigidly thereto and having universal connection in a socket piece 27 rigidly secured to the adjacent end of the receptacle. The nuts 25 thus have permanent positive connection with the ends of the receptacle. Any suitable form of crank or wrench, indicated at 28, may be employed to coöperate with the upper polygonal end 29 of each screw. Upon applying the wrench to the screws they may be quickly loosened so that the upper ends of the screws may be slipped freely longitudinally from the ends of the spring, if it is desired to so disengage them, or the screws and spring may be maintained in connection with one another and by lifting the cover vertically from its receptacle, all the parts may be swung together laterally so as to lie at one side of the receptacle, the cover and the connecting parts all swinging around the line joining the centers of the balls. After the ham is prepared and wrapped in its skin and deposited in the receptacle, the cover will be replaced on top of the ham and then by applying the wrench as above described, the screws may be tightened to place the ham under the desired degree of compression, an operation requiring a minimum amount of time and effort. The compression and the swelling of the ham will insure the molding thereof to correspond with the interior of the receptacle and cover. If there is any tendency of the ham to swell during the cooking operation, the spring will accommodate itself and the cover to such action.

I claim:

1. In a meat cooker, the combination of a receptacle having a bottom of generally cylindrical form but provided with circumferential inwardly projecting ridges and having one end larger than the other and flat, a cover for the receptacle having a substantially flat central portion, and a downwardly projecting sharp edged flange slidable within the open upper portion of the receptacle, and means carried permanently by the ends of the receptacle to force the cover into the receptacle.

2. In a meat cooker, the combination of a receptacle having a rounded bottom and substantially flat upwardly projecting sides and ends, a cover for the receptacle movable downwardly between the sides and between the ends, a leaf spring connected to the top of the cover, a pair of jack screws journaled in the ends of the spring, a pair of nuts coöperating with the screws opposite the ends of the receptacle, and ball and socket pieces permanently connecting the screws and nuts to the ends of the receptacle.

3. In a meat cooker, the combination of a rigid receptacle to receive the wrapped meat to be molded and cooked, a cover for the receptacle, means extending between the cover and the receptacle to compress the cover relatively to the receptacle to mold the meat, and rigid projections within the receptacle to engage the meat wrapper and hold it in position while the meat is being molded and cooked.

HANS ADELMANN.